United States Patent [19]
Comer et al.

[11] Patent Number: 5,530,736
[45] Date of Patent: Jun. 25, 1996

[54] RADIOTELEPHONE WITH MULTIPLE SIMULTANEOUS TELEPHONE NUMBER IDENTITIES

[75] Inventors: Edward I. Comer, Marietta; Donald M. Cardina, Lawrenceville; Charles M. Link, II, Roswell, all of Ga.

[73] Assignee: BellSouth Corporation, Atlanta, Ga.

[21] Appl. No.: 277,593

[22] Filed: Jul. 20, 1994

[51] Int. Cl.⁶ .................................................. H04Q 7/20
[52] U.S. Cl. .................................... 379/58; 379/57
[58] Field of Search ............................ 379/57, 58, 59, 379/60, 61; 455/56.1, 33.1, 54.1

[56] References Cited

U.S. PATENT DOCUMENTS

| | | | |
|---|---|---|---|
| 3,581,019 | 5/1971 | Ryan . | |
| 4,486,624 | 12/1984 | Puhl et al. . | |
| 4,677,653 | 6/1987 | Weiner et al. | 379/58 |
| 4,734,928 | 3/1988 | Weiner et al. | 379/59 |
| 4,875,230 | 10/1989 | Blair | 379/63 |
| 4,890,315 | 12/1989 | Bendixen et al. | 379/59 |
| 5,020,091 | 5/1991 | Krolopp et al. | 379/58 |
| 5,020,093 | 5/1991 | Pireh | 379/59 |
| 5,090,051 | 2/1992 | Muppidi et al. | 379/61 |
| 5,173,933 | 12/1992 | Jabs et al. | 379/58 |
| 5,247,567 | 9/1993 | Hirano | 379/61 |
| 5,265,150 | 11/1993 | Helmkamp et al. | 379/58 |
| 5,365,573 | 11/1994 | Sakamoto et al. | 379/61 |
| 5,371,781 | 12/1994 | Ardon | 379/59 |

*Primary Examiner*—Curtis Kuntz
*Assistant Examiner*—Michael B. Chernoff
*Attorney, Agent, or Firm*—Robin, Blecker, Daley & Driscoll

[57] ABSTRACT

A radiotelephone apparatus in which a radiotelephone transceiver monitors a control channel for paging signals and a controller automatically controls a radiotelephone transceiver to generate an acknowledgment signal in response to receipt of a paging signal carrying a telephone number identity which is any one of a plurality of predetermined telephone number identities.

18 Claims, 9 Drawing Sheets

RADIOTELEPHONE WITH MULTIPLE SIMULTANEOUS TELEPHONE NUMBER IDENTITIES

BACKGROUND OF THE INVENTION

This invention relates to radiotelephones and, in particular, to radiotelephones having multiple telephone number identities.

In a typical radiotelephone, the radiotelephone includes a radiotelephone transceiver which receives radiotelephone signals from and transmits radiotelephone signals to a radiotelephone telephone system in which the radiotelephone is situated. The radiotelephone transceiver is controlled by a radiotelephone controller, usually including a program driven microprocessor and a memory.

In a standard radiotelephone, the radiotelephone controller controls the radiotelephone transceiver to receive and transmit control signals on one or more control channels of the radiotelephone system. One type of control signal is a paging signal which is broadcast by the radiotelephone system to initiate an incoming call to a radiotelephone. Another type of control signal is an access signal which is transmitted by a radiotelephone into the system to initiate an outgoing call from the radiotelephone.

Each paging signal and each access signal includes identifying data or information which is used to identify the particular radiotelephone associated with the signal. In particular, each such signal includes a telephone number identity (TNI) which identifies the radiotelephone in terms of a telephone number or routing number in the radiotelephone system.

The TNI of a radiotelephone is usually stored in the memory of the radiotelephone controller and is retrieved for processing of each paging signal received by the radiotelephone transceiver and for generating each access signal to be transmitted by the transceiver. When a paging signal is received by a radiotelephone transceiver, the transceiver couples the paging signal to the radiotelephone controller. The radiotelephone controller then extracts from the paging signal the TNI carried by the paging signal and also retrieves from its memory the TNI of its radiotelephone and compares the two TNIs. If a match is found, the radiotelephone controller recognizes that the paging signal is for it and that the call associated with the paging signal is for its radiotelephone. Accordingly, the radiotelephone controller causes the radiotelephone transceiver to transmit a response signal into the radiotelephone system so that the call connection process to the radiotelephone can be continued and completed.

As can be appreciated, with the above standard radiotelephone, the radiotelephone has only a single TNI and thus can only respond to paging signals, i.e., incoming calls, and generate access signals, i.e., initiate outgoing calls, based on this single TNI. In order to add more flexibility to the standard radiotelephone, modifications to the radiotelephone have been made which permit the radiotelephone to operate based on multiple TNIs. In these modified radiotelephones, user switches on the radiotelephone permit the user to select which one of the multiple TNIs is to be active for the radiotelephone and, therefore, to be retrieved from its memory in connection with the processing of incoming paging signals and the generating of outgoing access signals. Accordingly, once the user selects a particular TNI, the radiotelephone will only use this TNI for processing all incoming and outgoing calls. Radiotelephones of this type are disclosed, for example, is U.S. Pat. Nos. 4,734,928 and 5,020,091.

More particularly, in the U.S. Pat. No. 4,734,928 a radiotelephone with multiple TNIs is disclosed in which a user can manually select different telephone numbers for use with different radiotelephone systems or for use with outgoing and incoming calls. In the U.S. Pat. No. 5,020,091, the radiotelephone prompts a user when the user moves into a different telephone system, and the user can manually select the TNI assigned to that system. However, these radiotelephones still have limited application, since, at any given time, a radiotelephone is automatically active for only a single, manually selected TNI.

It is, therefore, an object of the present invention to provide a radiotelephone having an improved and more flexible ability to take on TNIs.

It is a further object of the present invention to provide a radiotelephone meeting the aforesaid object and which is further adapted for use in a radiotelephone system as disclosed in U.S. patent application Ser. No. 08/114,648 assigned to the same assignee hereof.

SUMMARY OF THE INVENTION

In accordance with the principles of the present invention, the above and other objectives are realized via a radiotelephone transceiver which is adapted to receive and transmit paging and access signals respectively, which include TNIs and which are associated with respective incoming and outgoing telephone calls and further via a controller for automatically controlling the radiotelephone to cause the radiotelephone transceiver to respond to paging signals carrying any one of a plurality of predetermined TNIs. The controller is further adapted to automatically cause each access signal from the transceiver to include any one of the predetermined TNIs.

The transceiver of the invention is thus able to automatically respond to a paging signal and/or automatically generate an access signal having any of the plurality of the predetermined TNIs all of which are active and able to be selected during the time that the radiotelephone transceiver is able to receive and respond to paging signals and/or the time the radiotelephone transceiver is able to generate and establish access signals. This adds considerable flexibility to the operation of the radiotelephone transceiver and controller combination.

The controller used with the radiotelephone transceiver can be a radiotelephone controller which together with the radiotelephone transceiver forms a radiotelephone. The controller can also be a separate unit from the radiotelephone transceiver and its radiotelephone controller, in which case the controller acts to establish for the radiotelephone controller its TNI by instructing the radiotelephone controller to take on one of the predetermined plurality of TNIs.

In a further aspect of the invention, multiple combinations of respective radiotelephone transceivers and radiotelephone controllers are used in a system and share the plurality of predetermined TNIs. In this case, the controller includes an arbitration function which determines or selects which of the radiotelephone controllers is to handle an incoming call and, therefore, take on the associated TNI.

The functions of the controller serving the multiple radiotelephones can also be incorporated into the radiotelephone controller of one of the radiotelephones which then acts as a master radiotelephone with the other radiotelephones acting as slave radiotelephones.

In still a further aspect of the invention, the system of multiple radiotelephones is incorporated into the radiotelephone system of the '648 patent application to simplify the system.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
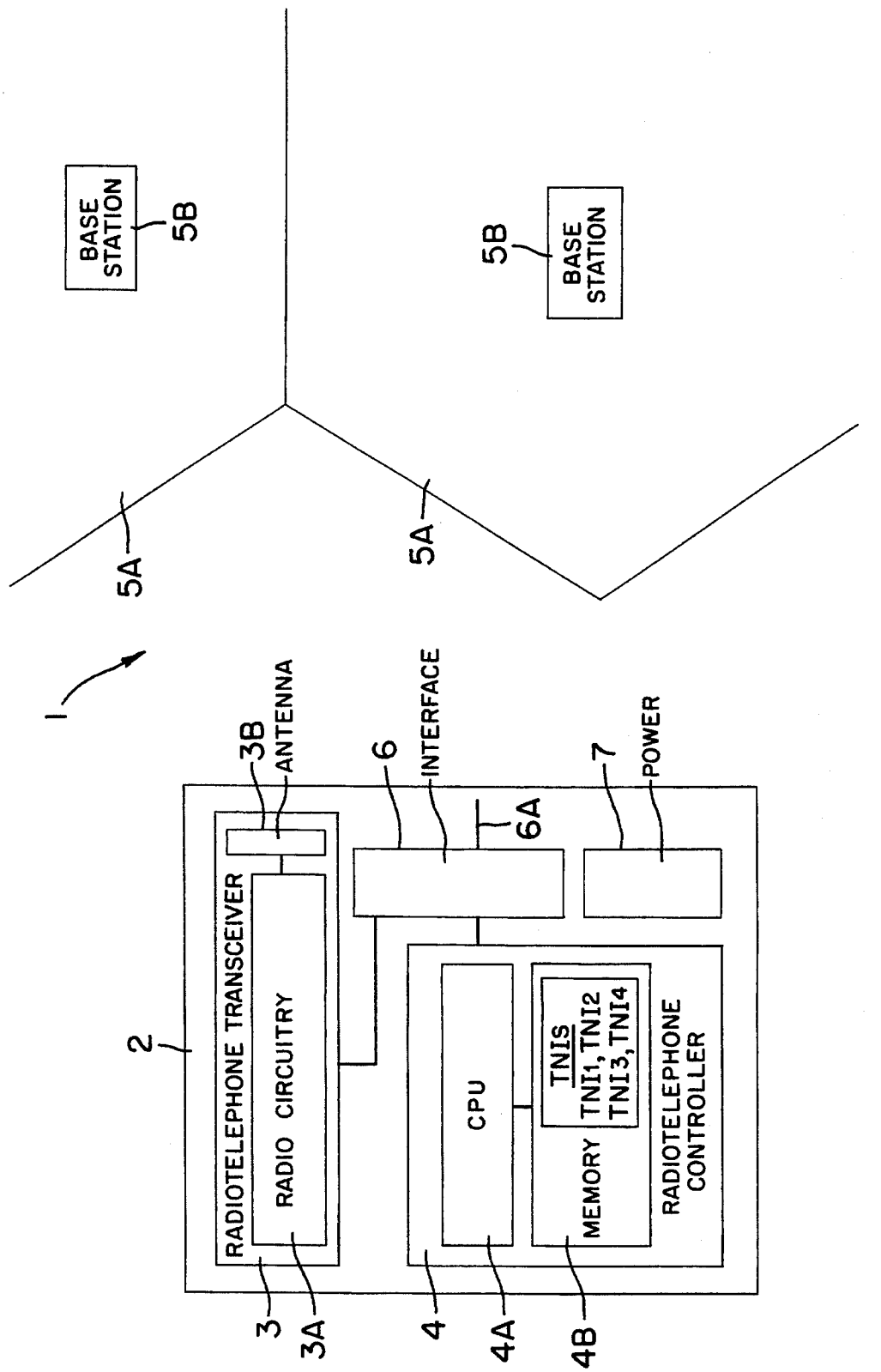
FIG. 1 shows a block diagram of a radiotelephone system employing a radiotelephone in accordance with the principles of the present invention.

FIG. 1 illustrates a cellular radiotelephone system 1 which employs a radiotelephone 2 in accordance with the principles of the present invention. As shown, the radiotelephone 2 includes a transceiver 3 comprised of radio circuitry 3A and an antenna 3B which allows the radiotelephone 2 to transmit radio signals into and receive radio signals from the radiotelephone system 1. The latter system is shown schematically as including cells 5A having base stations 5B which transmit radio signals to and receive radio signals from the radiotelephones in their respective cells.

The radiotelephone 2 also includes a radiotelephone controller 4 having a microprocessor or central processing unit 4A and memory 4B which usually contains both permanent and temporary storage units. An interface circuit 6 communicates with the controller 4 and transceiver 3 and includes a communications bus 6A which is of the type used to carry signals and data from the radiotelephone. This bus normally is coupled to a handset (not shown) where the radiotelephone is to interface directly with a user. A power source 7 provides power to the aforesaid components of the radiotelephone.

As is well known, the radiotelephone system 1 operates over a number of channels which carry various signals between the base stations 5B and the radiotelephones of the system. While the majority of these channels are dedicated to carrying voice signals, a number are used as control channels for carrying control signals and identification information.

Two types of control signals carried by a control channel are paging signals and access signals. A paging signal is broadcast by a base station 5B in its control channels and is used to establish a call to a radiotelephone. This is accomplished by including in the paging signal the telephone number identity (TNI) associated with the radiotelephone being called.

When a paging signal is received by the transceiver 3 of the radiotelephone 2, the signal is coupled from the transceiver 3 to the radiotelephone controller 4 which extracts from the paging signal the TNI. The radiotelephone controller 4 then recalls from the memory unit 4B, the resident TNI for the radiotelephone. If the resident TNI and the paging signal TNI match, the radiotelephone 2 then responds to the page with an acknowledgement signal which is transmitted by the transceiver 3 on the appropriate control channel. This signal is then received by the base station 5B transmitting the paging signal, and the base station 5B continues with processing of the call connection.

In accordance with the principles of the present invention, the radiotelephone 2 is adapted such that it is capable of automatically responding to paging signals carrying any one of a plurality of TNIs. More particularly, the radiotelephone 2 is adapted so that its memory unit 4B includes a plurality of TNIs (shown as TNI1 to TNI4 in FIG. 1) and so that the radiotelephone can respond to paging signals carrying any of these TNIs.

Accordingly, with the radiotelephone 2 so adapted, when an incoming paging signal is sent by the transceiver 3 to the radiotelephone controller 4, the radiotelephone controller 4 now compares the TNI carried in the paging signal with each of the TNIs TNI1 to TNI4. If a match is found with any one of these TNIs, the radiotelephone 2 takes on this TNI. More particularly, the radiotelephone controller 4 of the radiotelephone 2 uses this TNI to cause the radiotelephone transceiver 3 to acknowledge the paging signal in usual fashion thereby continuing with the call connection.

The radiotelephone 2 of the invention thus has a plurality of TNIs which are all active and able to be used at all times when the radiotelephone is able to receive and respond to a paging signal.

As above-indicated, the control channel of the radiotelephone system 1 carries access signals as well as paging signals. An access signal is generated by a radiotelephone when it wishes to commence an outgoing call from the radiotelephone. The access signal includes the TNI of the radiotelephone which is retrieved by the radiotelephone controller from the memory of the radiotelephone and included in the access signal when generated and transmitted by the radiotelephone transceiver.

In the case of the radiotelephone 2 of the invention, when an access signal is to be generated, the radiotelephone controller 4 automatically determines or selects which one of the TNIs TNI1 to TNI4 it wishes to take on for the outgoing call and automatically retrieves this selected TNI from the memory 4B. The retrieved TNI is then included in the access signal generated by the radiotelephone transceiver 3 and transmitted on the control channel. The radiotelephone 2 will thus have this TNI for the outgoing call.

Figure 2:
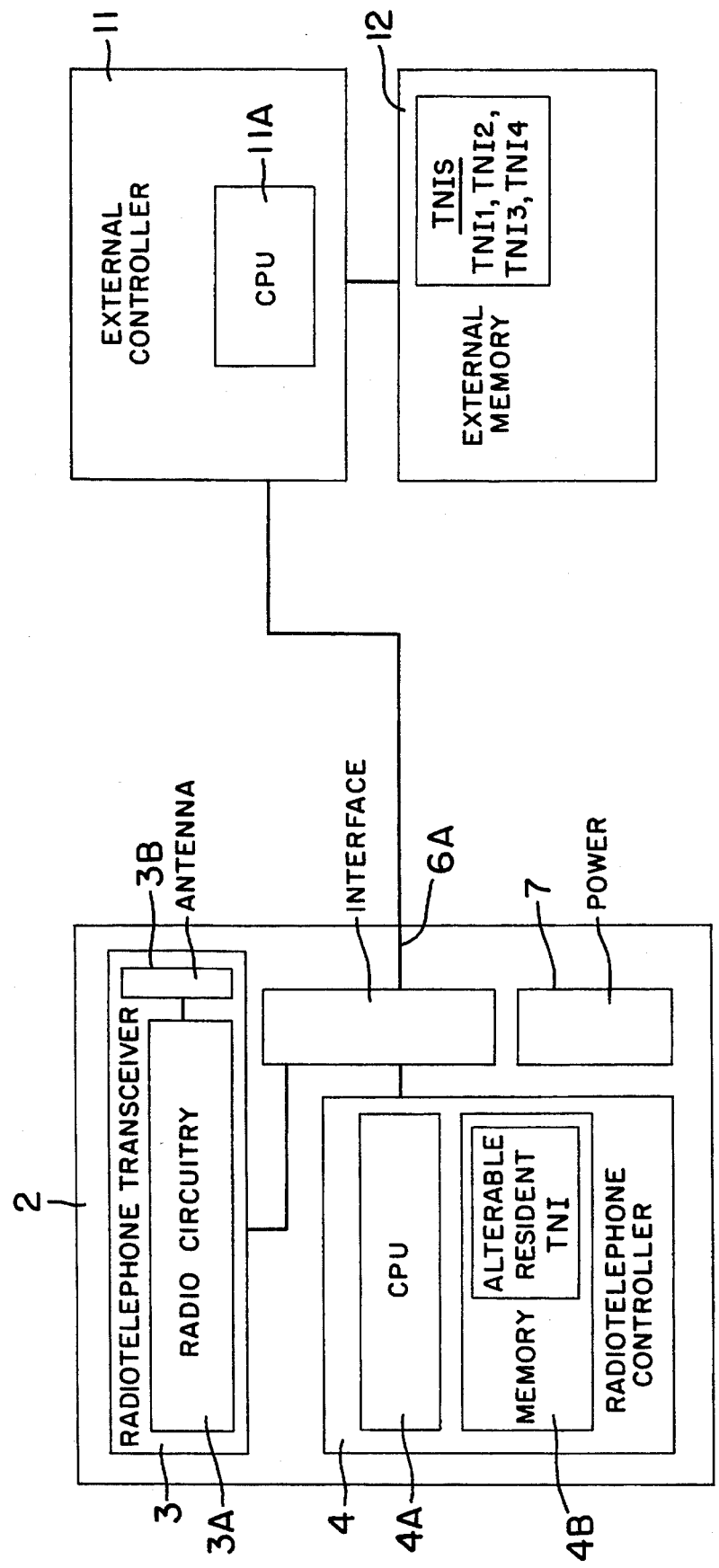
FIG. 2 shows a modification of the radiotelephone of FIG. 1.

In the embodiment of the invention in FIG. 1, the radiotelephone controller 4 itself stores and compares the plurality of predetermined TNIs TNI1 to TNI4 with the TNI in an incoming paging signal and provides selection of the TNI for an outgoing access signal. FIG. 2 shows a second embodiment of the invention in which these functions are carried out by an external memory 12 and an external controller 11 which includes a microprocessor or central processing unit 11A.

In the embodiment of the invention of FIG. 2, the external memory 12 stores the TNIs TNI1 to TNI4. The external controller 11, in turn, communicates with the radiotelephone 2 over the interface bus 6A. In particular, the radiotelephone controller 4 of the radiotelephone 2 is adapted to communicate to the external controller 11 over the interface bus 6A, all paging signals and requests for access signals. The radiotelephone controller 4 then awaits a command signal from the external controller 11.

In the case of a transmitted paging signal, if the TNI of the paging signal matches one of the TNIs TNI1 to TNI4 stored in the external memory 12, the external controller 11 sends a command which includes the matched TNI to the radiotelephone controller 4 instructing the radiotelephone controller to respond to the paging signal with this TNI. The matched TNI is now used to alter any resident TNI stored in the memory 4B. It is also included in the acknowledgement to the paging signal transmitted by the radiotelephone controller 4 and transceiver 3 into the system 1 so that the procedure for the incoming call set up is continued.

In the case of a request for an access signal, the external controller 11 selects which of the TNIs TNI1 to TNI4 is to be used in the access signal for the outgoing call. The selected TNI, after retrieval from the external memory 12, is sent by the external controller 11 over the communication bus 6A to the radiotelephone controller 4 where it is then used to alter any resident TNI stored in the memory 4B and as the TNI for the access signal of the outgoing call.

Figure 3:
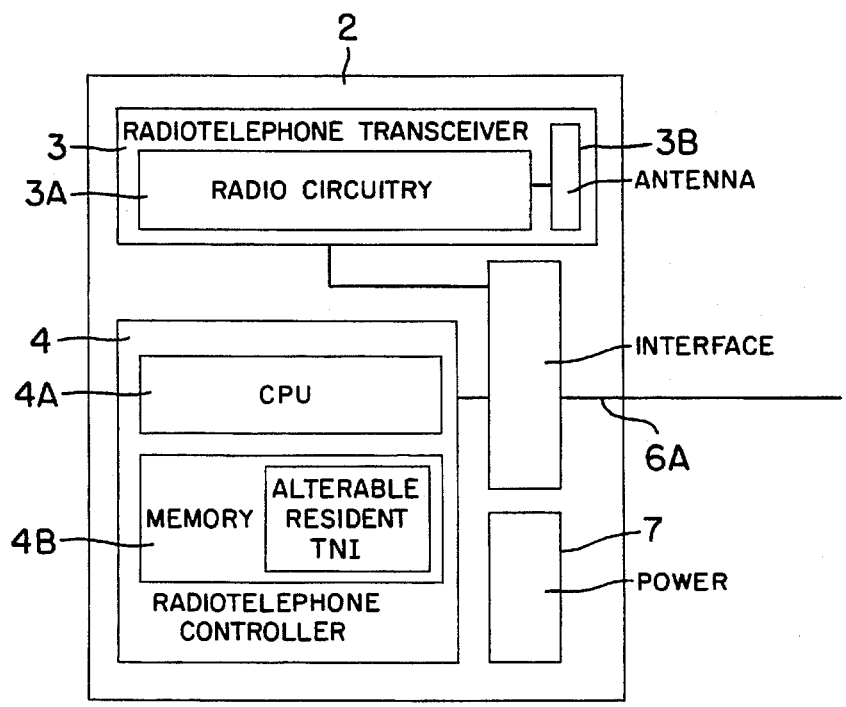
FIG. 3 shows a modification of the radiotelephone of FIG. 2 forming an assembly in which a plurality of radiotelephones is used.
Figure 3:
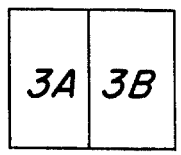
Figure 3A:
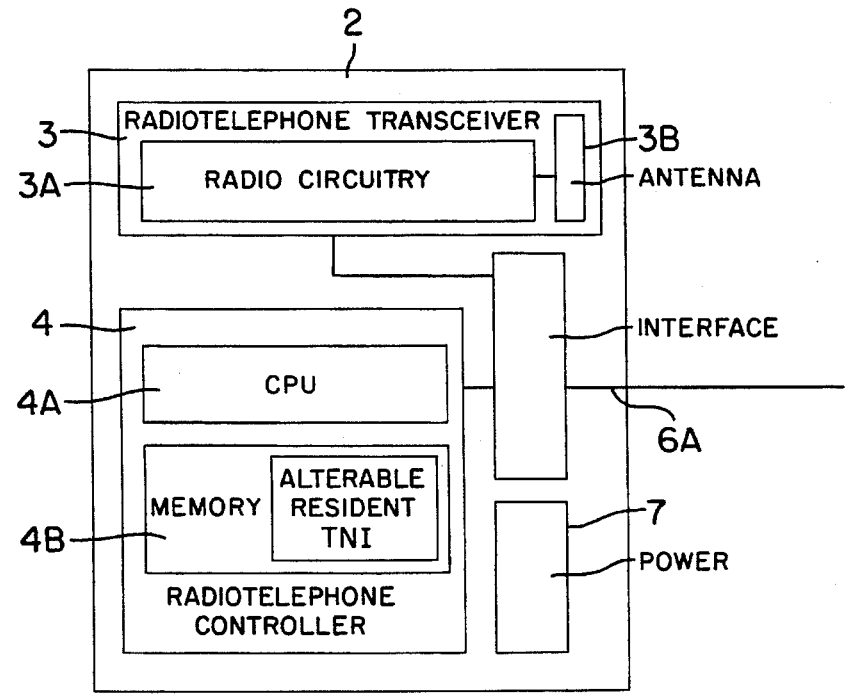
Figure 3B:
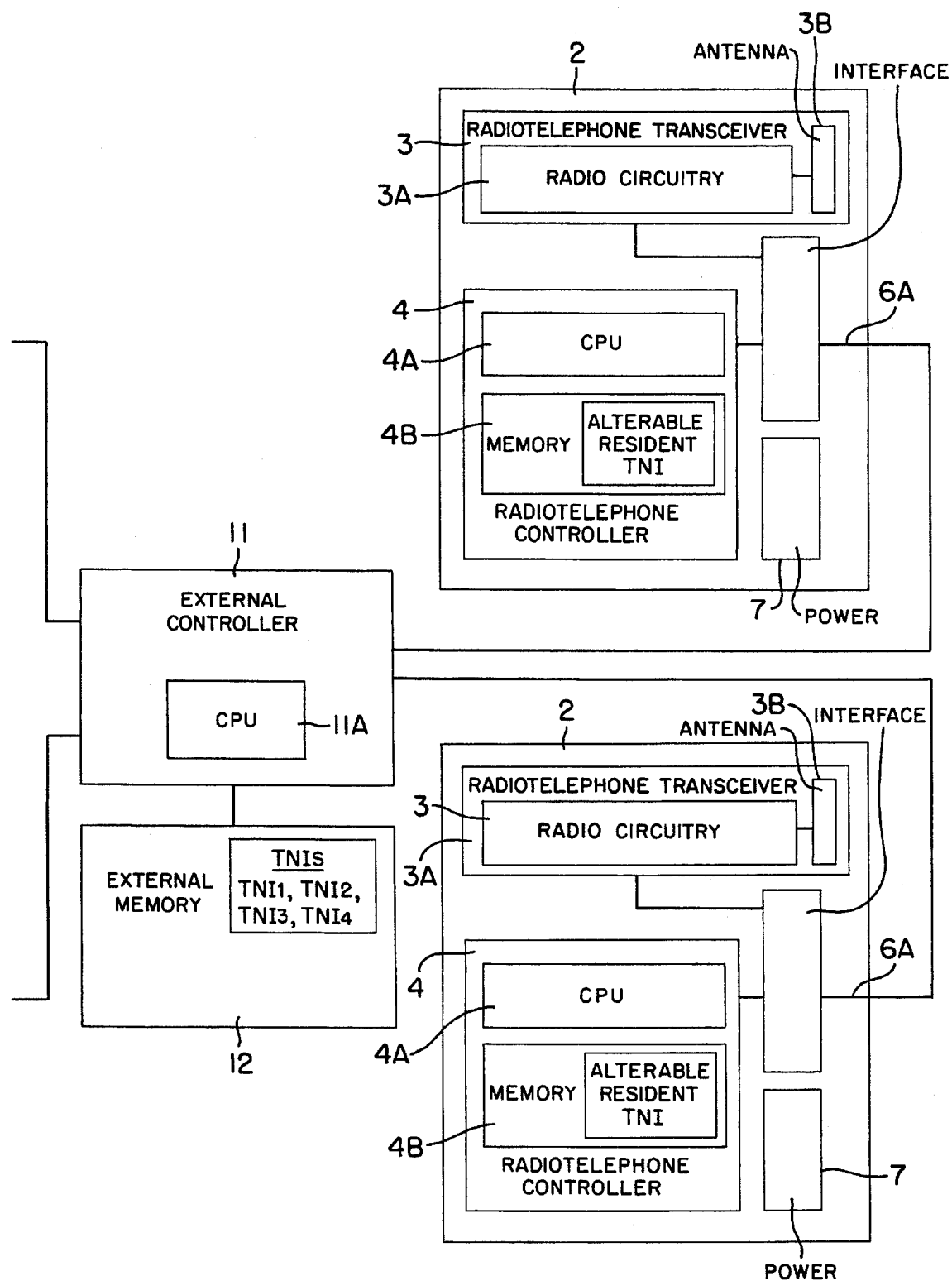

FIG. 3 shows a further modification of the embodiment of FIG. 2 in which additional radiotelephones are added to the assembly and commonly share or can take on the plurality of predetermined telephone identities TNI1 to TNI4. In this case, the buses 6A of the radiotelephones 2 each communicate with the external controller 11 to communicate paging signals and access request signals to the controller.

When an incoming paging signal is received by one or more of the radiotelephones 2 and communicated by the radiotelephone to the external controller 11, the external controller first determines whether the TNI in the paging signal is a match with any one of the TNIs TNI1 to TNI4. If a match is found, the external controller 11, based upon a predetermined arbitration or selection function, selects or determines which of the radiotelephones is to handle the incoming call associated with the paging signal.

Once this selection is made the external controller 11 sends a command signal to the selected radiotelephone 2, including the matched TNI, instructing the radiotelephone 2 to acknowledge the paging signal using this TNI. The selected radiotelephone alters its memory 4B by replacing any resident TNI with the matched TNI, and then the radiotelephone controller 3 and transceiver 4 of the radiotelephone 2 cause an acknowledgement signal to be generated and transmitted to continue with the call setup and connection.

When a radiotelephone 2 of FIG. 3, on the other hand, generates an access signal request, the request is communicated from its radiotelephone controller 4 over its bus 6A to the external controller 11. The controller 11 then selects an appropriate TNI from the TNIs TNI1 to TNI4 in the external memory 12 and communicates it back to the radiotelephone controller. The radiotelephone controller then alters any resident TNI in its memory with the selected TNI and causes generation and transmission by its radiotelephone transceiver of an access signal with the selected TNI.

The radiotelephones 2 and the external controller 11 of the assemblies of FIGS. 2 and 3 can also be adapted so that the operation of the system is simplified. In particular, the radiotelephones 2 and external controller 11 can be operated so that each radiotelephone 2 has normal, monitor and slave modes of operation.

In a normal mode of operation, a radiotelephone 2 acts as any radiotelephone to lock onto a control channel and to also respond to paging signals and generate access signals based upon a resident TNI in the memory of the radiotelephone. In a monitor mode of operation, a radiotelephone 2 does not respond to paging signals, but instead will direct all paging signals to the external controller 11 over its interface bus 6A.

In a slave mode of operation, a radiotelephone 2 responds to paging signals, only if an appropriate command signal is or has been received from the external controller 11. A command signal will include one of the TNIs TNI1 to TNI4 selected by the external controller 11 and will also include one of the Command Words A, B or C which command the radiotelephone to perform the following respective actions: (a) Command Word A—store the data transmitted with the command, but do not respond to any page; (b) Command Word B—assume a page has occurred and respond with an acknowledgement immediately with the stored data transmitted with the command including the selected TNI; or (c) Command Word C—respond only to the next page whose TNI corresponds to the TNI transmitted with the command.

With the radiotelephones 2 adapted to have the aforesaid operating modes, the assembly of FIG. 3 can be operated in the following manner. Upon initialization, each radiotelephone 2 enters the normal mode. In this mode, each radiotelephone 2, via its radiotelephone transceiver 3 and its radiotelephone controller 4, monitors the control channels of the system 1 and locks onto the control channel with the strongest signal.

The external controller 11 then places one of the radiotelephones 2 in the monitor mode and one or more of the other radiotelephones 2 in the slave mode. The radiotelephone 2 in the monitor mode communicates all its received paging signals to the external controller 11 and the controller 11, in turn, processes each paging signal by comparing the TNI in the paging signal with the TNIs TNI1 to TNI4. If a match occurs for a comparison, the controller 11 sends a command including a Command Word, e.g., the Command Word B, and the matched TNI, to one of the radiotelephones 2 in the slave mode, as determined or selected by the controller 11 using its arbitration or selection function.

Upon receipt of this command including the Command Word B, the radiotelephone controller 4 of the selected slave radiotelephone 2, having altered its resident TNI in the memory 4B with the received TNI in the command, formulates an appropriate acknowledgement signal which is then transmitted by the radiotelephone transceiver 3. This continues the call setup process with the call now being completed through the acknowledging slave radiotelephone.

In the above description of the assembly of FIG. 3, if all the slave radiotelephones 2 are busy with calls when a paging signal is transmitted by the monitoring radiotelephone 2 to the controller 11 and the controller 11 finds a match, the controller 11 can instruct the monitoring radiotelephone 2 to switch from its monitor mode to its slave mode. The controller 11 then sends a command as above-described to the switched radiotelephone including the matched TNI, thereby instructing the radiotelephone to respond to the paging signal with this TNI.

Figure 4A:
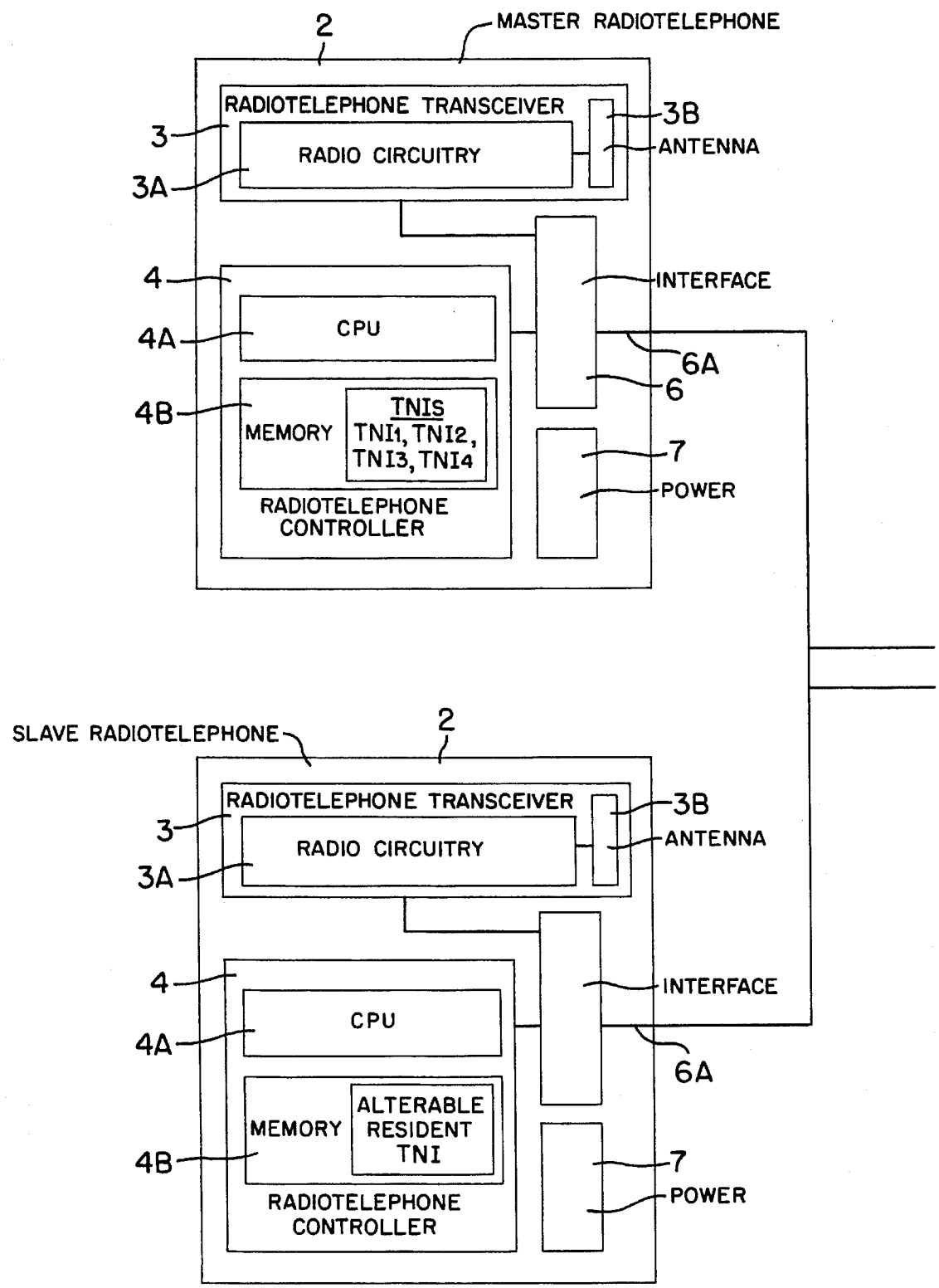
FIGS. 4 and 5 show further modifications of the radiotelephone assembly of FIG. 3.
Figure 4B:
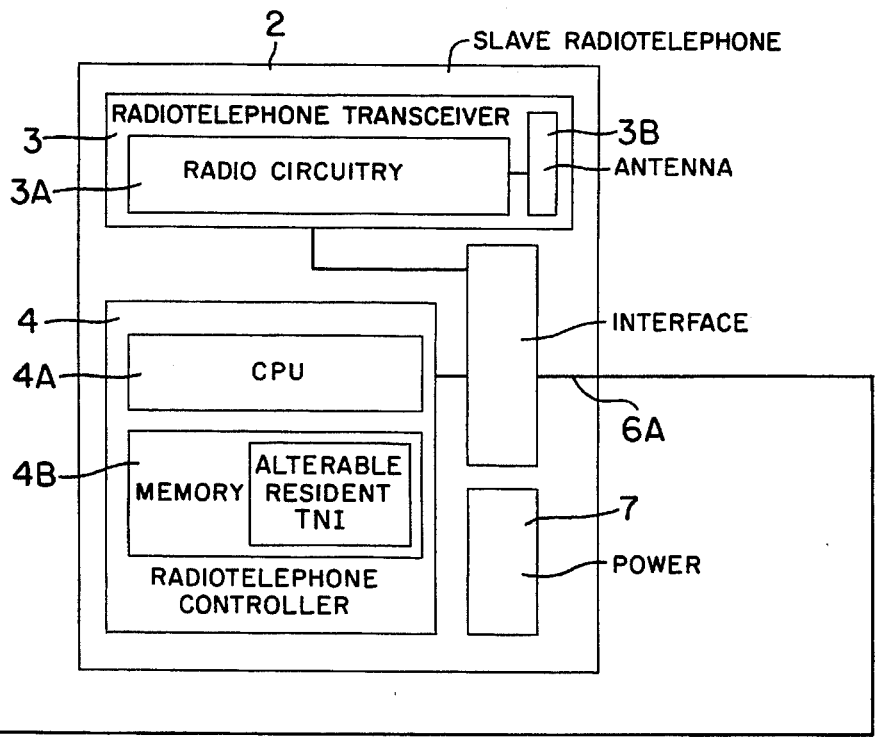
Figure 4B:
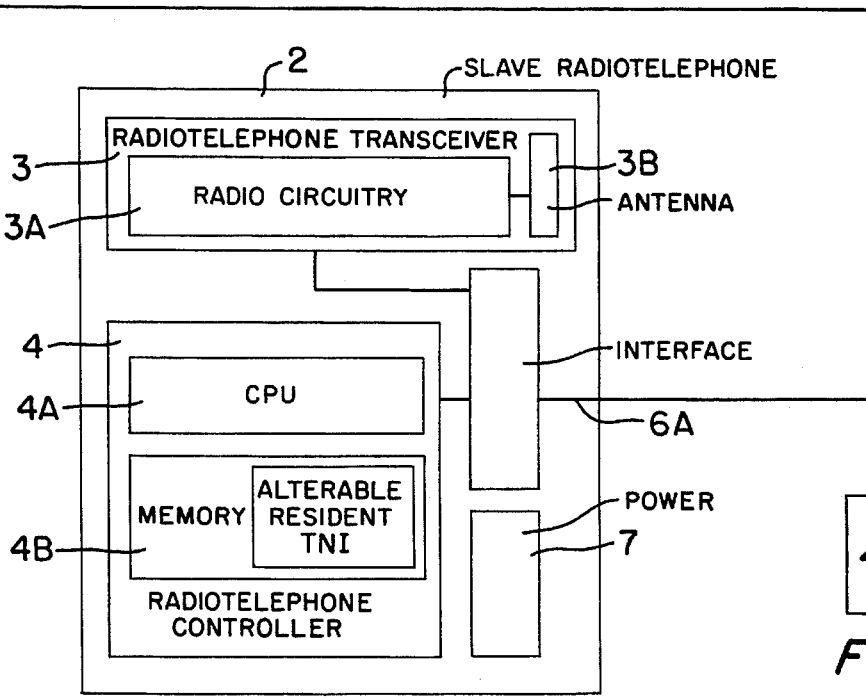

The assembly of FIG.3 can also be operated with the functions of the controller 11 and memory 12 carried out by and incorporated into any one of the radiotelephones 2. This is illustrated in FIG. 4. In such case, upon initialization, each radiotelephone 2 will again go into its normal mode first and lock onto a control channel of the system 1. One of the radiotelephones will then act as master in which it monitors all paging signals and provides the control and memory functions of controller 11 and memory 12. The other radiotelephones 2 will be placed in the slave mode to be controlled by the master radiotelephone 2 in response to paging signals. In this case also, the master radiotelephone can switch to a slave mode and respond to a paging signal, if all the current slave radiotelephones 2 are busy.

Figure 5A:
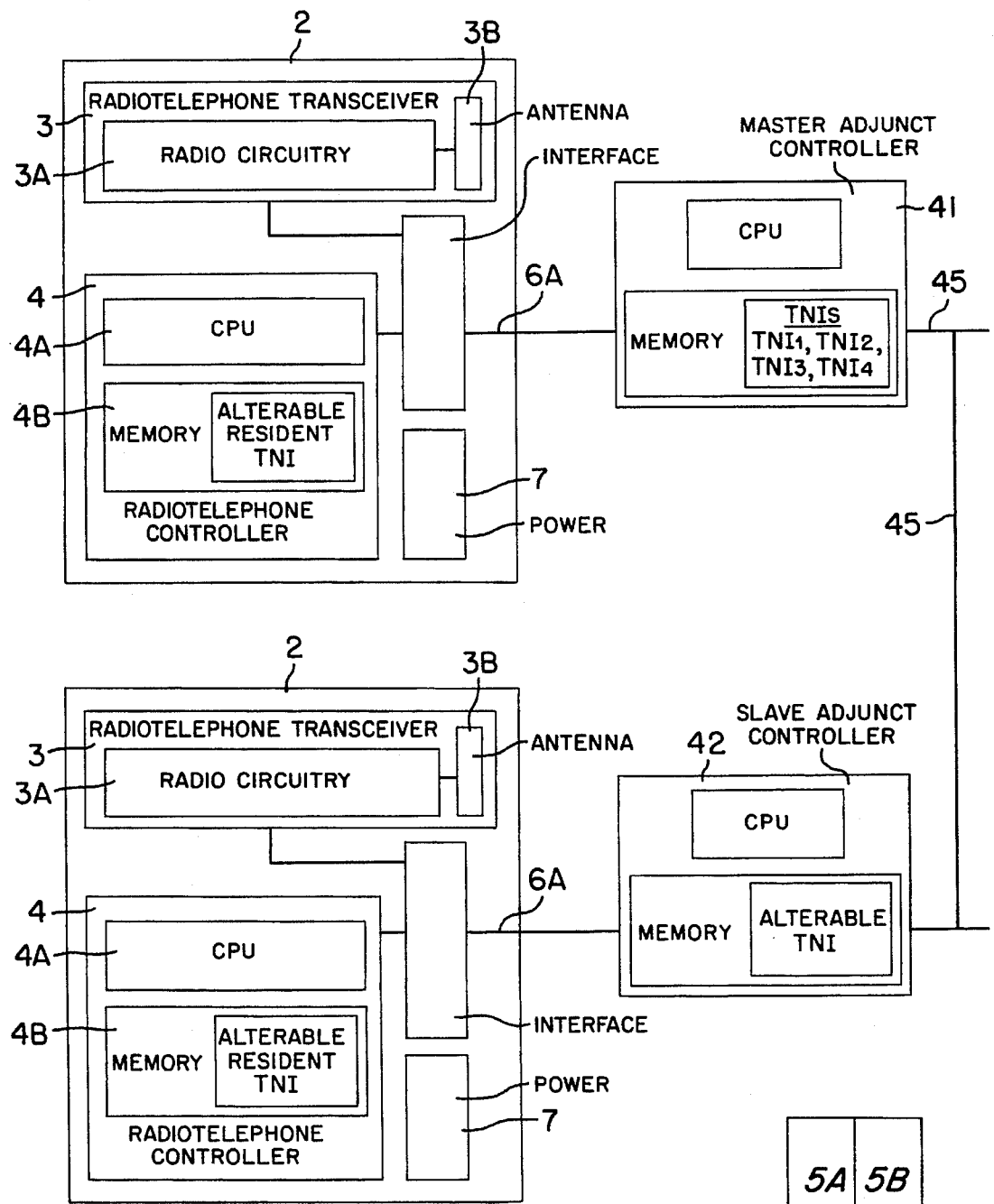
Figure 5B:
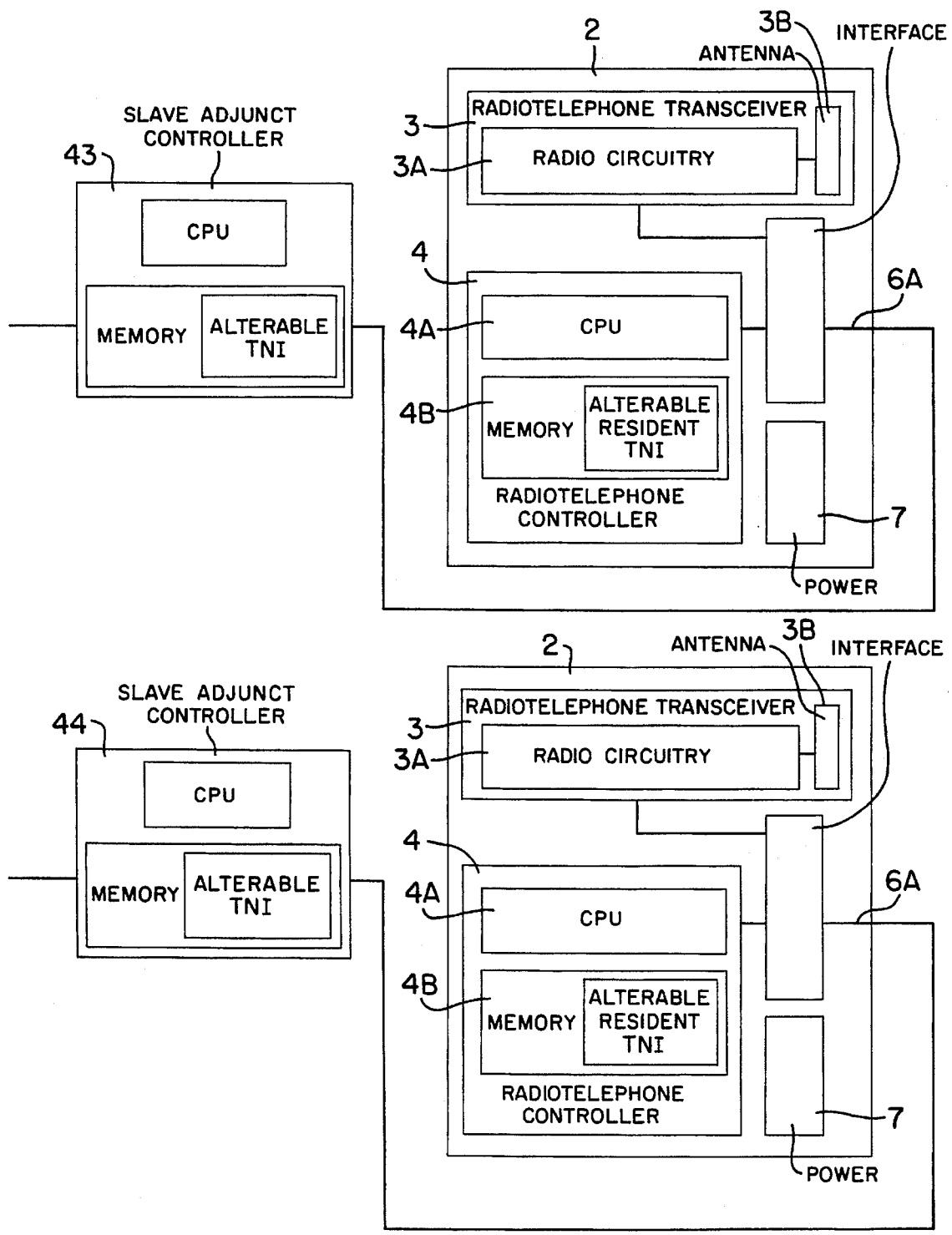

It should be noted that system of FIG. 4 can also be modified so that some or all of the functions needed to implement the invention in the radiotelephone controller 4 are carried out in an adjunct controller which communicates with the radiotelephone controller. This is illustrated in FIG. 5 where adjunct controllers 41 to 44 communicate with the radiotelephone controllers 4 of the radiotelephones 2. As shown, the adjunct controller 41 has taken on the role of master controller, while the adjunct controllers 42 to 44 have taken on the roles of slave controllers. Also, a private bus 45 is included to provide a local area network type communication between the adjunct controllers.

Figure 6:
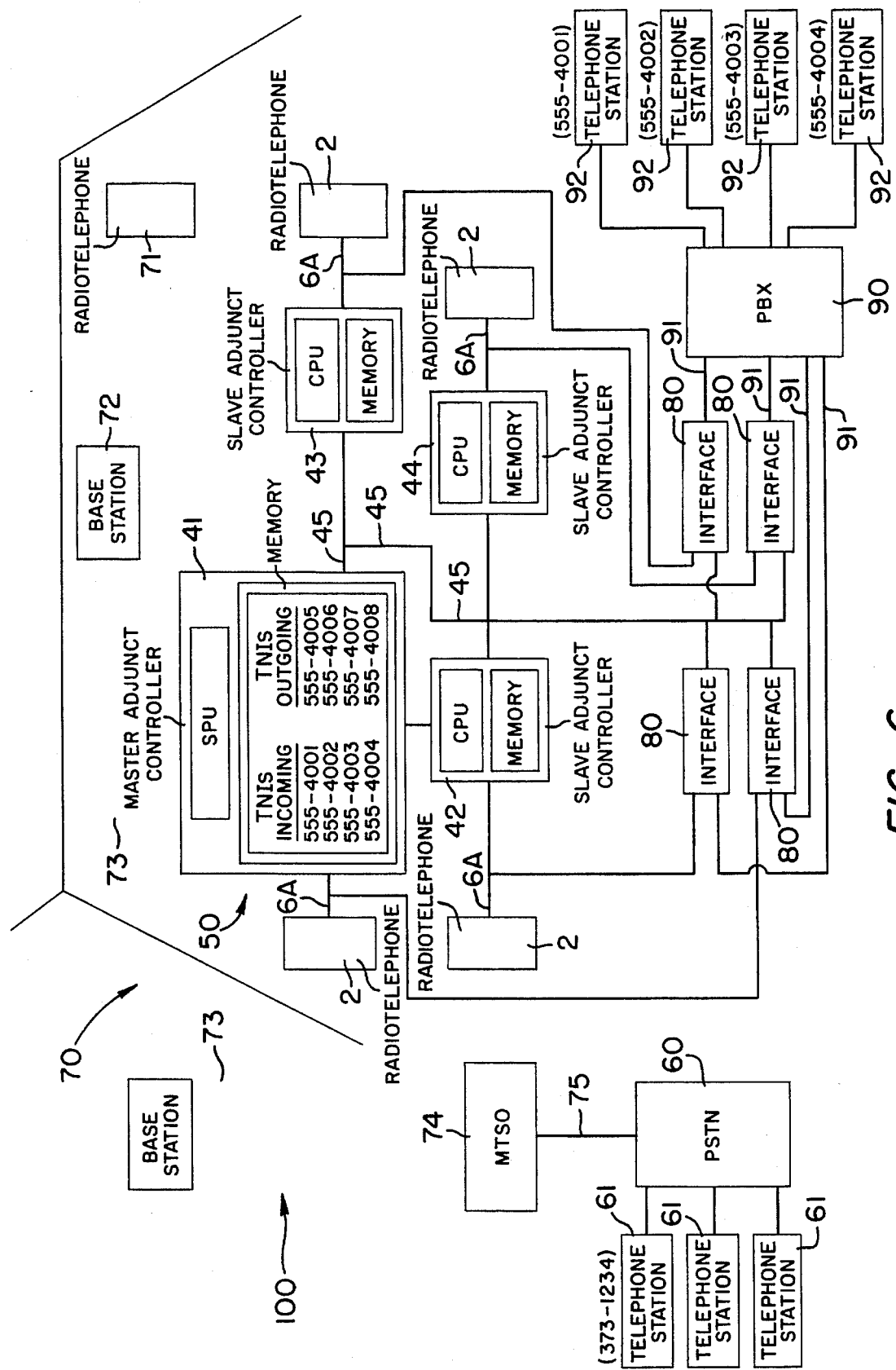
FIG. 6 shows the radiotelephone assembly of FIG. 5 incorporated into the radiotelephone system of the '648 application.

FIG. 6 illustrates the radiotelephone assembly of FIG. 5 utilized in the telephone system of the '648 application, the teachings of which are incorporated herein by reference. In the telephone system of FIG. 6, the assembly of FIG. 5, is used to communicate with the trunks of a telephone switching system, such as a private branch exchange (PBX), via the interface circuits of the '648 application, so as to permit the telephone stations served by the PBX to have direct access to the radiotelephone system.

As shown in FIG. 6, the telephone system 100 comprises subscriber telephone stations 61, which may be dial pulse, DTMF or ISDN stations, having directory or routing numbers RN. Only the routing number (373-1234) of one station is actually illustrated. The telephone stations communicate with and are served by a public switched telephone network (PSTN) 60.

The system 100 also comprises a radiotelephone system 70. The system 70 includes standard radiotelephones 71 as well as a radiotelephone assembly 50 as shown in FIG. 5 which includes the radiotelephones 2. The system 70 also utilizes base stations 72 which are associated with respective cells 73 and which radiocommunicate with the radiotelephones in such cells.

A mobile telephone switching Office (MTSO) 74 included in the system 70 provides selective linking or interconnection amongst the base stations 72 for calls to and from the radiotelephones of the system. Trunk circuits 75 link the MTSO 74 to the PSTN 60. This permits calls to be effected between the radiotelephones 71 and radiotelephone assembly 50 and the subscriber telephone stations 61.

As described in the '648 application, interfaces 80 permit the standard trunk circuits 91 of a further telephone switching system, shown as PBX 90, to directly access a radiotelephone of the radiotelephone system 70. The PBX 90 serves telephone stations 92, which may be dial pulse, DTMF or ISDN stations. These stations are thus able to access the radiotelephone system 70 via the PBX 90, trunks 91 and interfaces 80.

As described in the '648 application, each interface circuit 80 interfaces the standard supervision used with its associated trunk circuit 91 with the corresponding radiotelephone for effecting call originations and terminations. Each interface 80 additionally interfaces the standard signaling used with its respective trunk circuit 91 with its corresponding radiotelephone for effecting transfer of information.

In accordance with the principles of the present invention, each of the interfaces 80 and its respective standard telephone trunk circuit 91 are coupled into the radiotelephone system 70 through a radiotelephone 2 of the radiotelephone assembly 50. By utilizing the radiotelephones 2 of the assembly 50, instead of the standard radiotelephones 71, to provide this coupling the routing correlator described in the '648 application can be dispensed with, thereby reducing the cost and simplifying the telephone system 100.

In particular, the radiotelephone assembly 50 permits the MTSO 74 to use a different radiotelephone routing number RN for each of the telephone stations 92 served by the PBX 90. Each such radiotelephone routing number RN is included in the predetermined plurality of TNIs which the radiotelephones 2 of the assembly 50 can take on. Moreover, each such radiotelephone routing number RN can be the same number as the telephone number of its associated telephone station 92. Each such radiotelephone number can also differ from the telephone number of its associated station 92 by one or more or all digits, in which case the assembly 50 will correlate the radiotelephone routing number with the telephone number of the associated telephone station.

As a result, a call to any one of these radiotelephone routing numbers, after the call is passed by the MTSO 70 and appropriate base station 71 to the radiotelephone assembly 50, will result in a match with a corresponding TNI in the assembly. A radiotelephone 2 will thus be selected to acknowledge and take on the call with the matched TNI. The selected radiotelephone will then pass the call to its interface 80 with the appropriate telephone number (i.e., the radiotelephone number, if it is the same as the telephone number of the called station 92, or the telephone number determined based on correlation from the radiotelephone number, if the radiotelephone number is different from the telephone number of the called station 92).

The interface 80 will then pass the call and the appropriate number of digits of the telephone number needed by the PBX 90 to make a connection with the corresponding telephone station. The PBX 90 will generally need less than the total number of digits of the telephone number to complete a connection and when it receives these digits it will complete the connection to the associated telephone station 92.

A more detailed description of the system of FIG. 6 will now be given. In this description, it is assumed that the telephone stations 92 served by the PBX 90 have incoming numbers as follows: 555-4001; 555-4002; 555-4003; and 555-4004. It is further assumed that the radiotelephone routing numbers associated with these telephone numbers are the same as the telephone numbers. Accordingly, as indicated, the TNIs stored in the memory of the master adjunct controller 41 of the assembly 50 will include these telephone numbers as the radiotelephone routing numbers for incoming calls.

The flow for a call from a telephone station 61 connected to the PSTN 60 to the telephone station 92 connected to the PBX 90 and having the telephone number 555-4003 will now be described. When a subscriber at the station 61 dials the radiotelephone routing number 555-4003, the call and routing number are passed to the PSTN 60 which recognizes from the routing number that the call is to be carried via the radiotelephone system 70.

The PSTN 60 seizes an idle one of the trunks 75 and the call and routing number 555-4003 are passed to the MTSO 74 of the radiotelephone system 70. The MTSO 74 then identifies from the routing number that the call is to be routed through the base station 72 and cell 73 serving the radiotelephone assembly 50 which has this routing number.

The call and routing number 555-4003 are then passed to the appropriate base station 72 and the base station transmits a paging signal containing the routing number 555-4003 as the TNI of the called radiotelephone. The paging signal is received by the radiotelephone transceiver 3 of the radiotelephone 2 of the master radiotelephone of the assembly 50 and the paging signal is passed to the master adjunct controller 41. This controller extracts the TNI 555-4003 in the paging signal and compares it with the TNIs 555-4001, 555-4002, 555-4003 and 555-4004 stored in its memory.

When the controller 41 reaches the stored TNI 555-4003, a match is found and the master adjunct controller 41, using its arbitration and selection function, then selects one of the slave radiotelephones 2 to handle the incoming call and take on the TNI 555-4003. Assuming that the master adjunct controller 41 selects the radiotelephone 2 served by the slave adjunct controller 42, the master controller then transmits a command message with a COMMAND WORD B and the matched TNI 555-4003 to the slave adjunct controller 42.

The slave adjunct controller 42 then alters the resident TNI in its memory with the matched TNI 555-4003 and causes an acknowledgement to the paging signal to be generated and transmitted by the controller 3 and transceiver 4 of its associated radiotelephone 2. The slave adjunct controller 42 also passes the call and matched TNI to its associated interface 80 which seizes an idle trunk 91 toward the PBX 90.

The PBX 90 acknowledges this seizure with a wink signal and the interface 80 forwards the call and the appropriate number of digits of the matched TNI 555-4003 to the PBX. The PBX then rings the telephone station 92 having the telephone number 555-4003 of the matched TNI 555-4003. Upon the telephone station 92 answering, the PBX 90 passes answer supervision to the interface 80, whereupon the interface 80 instructs the slave adjunct controller 42 to effect completion of the call connection.

Having followed the flow of an incoming call, an outgoing call from a telephone station 92 to the telephone station 61 having the routing number 373-1234 will now be described. Upon a station 92 dialing the routing number 373-1234, the routing number and call are conveyed to the PBX 90 which seizes an idle trunk 91 toward one of the interfaces 80. The interface 80 of the seized trunk acknowledges this seizure of the trunk with a wink signal towards the PBX 90. The PBX then passes the call and the routing number 373-1234 to the interface 80.

The interface 80 thereupon communicates an outgoing call request to its respective adjunct controller in the radiotelephone assembly 50. It is assumed for the present discussion that the controller 43 has been seized so that the slave adjunct controller 43 receives the call request from its interface 80.

The slave adjunct controller 43 then transmits an access request signal to the master adjunct controller 41. In response to this request, the controller 41 selects an idle one of the stored TNIs assigned to outgoing calls (i.e., one of the TNIs 555-4005, 555-4006, 555-4007, 555-4008). The selected TNI is then communicated by the master adjunct controller 41 to the slave adjunct controller 43. The slave adjunct controller 43 then stores this TNI in its memory and causes its associated radiotelephone controller 4 and transceiver 3 to transmit an access message into the radiotelephone system 70 with the selected TNI.

The base station 72 serving the radiotelephone assembly 50 passes the access message to the MTSO 74 which grants access for the outgoing call. The slave adjunct controller 43 then causes its respective radiotelephone controller 4 and radiotelephone transceiver 3 to pass the call and routing number 373-1234 to the MTSO 74. The MTSO 74 recognizes from the routing number that it is for a telephone station served by the PSTN 60 and, therefore, seizes an idle trunk 75 to the PSTN. The MTSO 74 then passes the routing number 373-1234 and call to the PSTN 60, which rings the telephone station 61 having the routing number 373-1234 to complete the call.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:

1. A radiotelephone apparatus for use in a radiotelephone system, the radiotelephone system including one or more control channels in which are carried paging signals which identify radiotelephones to which calls are to be connected and in which are also carried acknowledgment signals from the radiotelephones for continuing the set-up of calls to the radiotelephones in response to paging signals identifying the radiotelephones, the radiotelephone apparatus comprising:

a plurality of first radiotelephone transceivers for receiving paging signals on a control channel;

a plurality of first radiotelephone controllers, each first radiotelephone controller controlling and forming a first radiotelephone with a different first radiotelephone transceiver and each first radiotelephone controller having an alterable telephone number identity;

one of said first radiotelephone controllers acting as a master controller and one or more of the other of said first radiotelephone controllers acting as a slave controller responsive to said master controller;

said master controller commanding each slave controller not to cause an acknowledgement signal to be generated by that slave controller in response to paging signals received by the first radiotelephone transceiver which forms a first radiotelephone with that slave controller; and said master controller, when a paging signal having any particular one of a plurality of predetermined telephone number identities is received by the first radiotelephone transceiver forming a first radiotelephone with said master controller, selecting a slave controller and commanding the selected slave controller to cause the alterable telephone number identity of the slave controller to be the particular one of the plurality of predetermined telephone number identities which the paging signal has and to cause the first radiotelephone transceiver which forms a first radiotelephone with that slave controller to transmit an acknowledgment signal, so as to continue with the set-up of a call in response to that paging signal.

2. A radiotelephone apparatus in accordance with claim 1 wherein:

each first radiotelephone controller includes: a second radiotelephone controller which communicates with the first radiotelephone transceiver which forms a first radiotelephone with that first radiotelephone controller; and an adjunct radiotelephone controller which communicates with the second radiotelephone controller and with one or more adjunct radiotelephone controllers of other of said first radiotelephone controllers.

3. A radiotelephone apparatus in accordance with claim 1 wherein:

said master controller, when a paging signal having a particular one of a plurality of predetermined telephone number identities is received by the first radiotelephone transceiver forming a first radiotelephone with that master controller and when all said slave controllers are in a busy condition, causing the alterable telephone number identity of the master controller to be the particular one of the plurality of predetermined telephone number identities which that paging signal has and causing the first radiotelephone transceiver which forms a first radiotelephone with said master controller to transmit an acknowledgement signal, so as to continue with the set-up of a call in response to that paging signal.

4. A radiotelephone apparatus for use in a radiotelephone system, the radiotelephone system including one or more control channels in which are carried paging signals which identify radiotelephones to which calls are to be connected and in which are also carried acknowledgment signals from the radiotelephones for continuing the set-up of calls to the radiotelephones in response to paging signals identifying the radiotelephones, the radiotelephone apparatus comprising:

a plurality of first radiotelephone transceivers for receiving paging signals on a control channel;

a plurality of first radiotelephone controllers, each first radiotelephone controller controlling and forming a first radiotelephone with a different first radiotelephone transceiver and each first radiotelephone controller having an alterable telephone number identity;

a master controller;

one or more of said first radiotelephone controllers being a slave controller responsive to signals from said master controller;

one of said first radiotelephone controllers being a monitor controller to cause each paging signal received by the first radiotelephone transceiver which forms a first radiotelephone with that monitor controller to be transmitted to the master controller without an acknowledgment signal responding to the paging signal being caused to be generated by that monitor controller;

and said master controller, when a paging signal having any particular one of a plurality of predetermined telephone number identities is transmitted to said master controller by said monitor controller, selecting a slave controller and commanding the selected slave controller to cause the alterable telephone number identity of the selected slave controller to be the particular one of the plurality of predetermined telephone number identities which that paging signal has and to cause the first radiotelephone transceiver which forms a first radiotelephone with that slave controller to transmit an acknowledgment signal so as to continue with the set-up of a call in response to that paging signal.

5. A radiotelephone apparatus in accordance with claim 4 wherein:

said master controller, when a paging signal having a particular one of a plurality of predetermined telephone number identities is transmitted to said master controller by the monitor controller and when all said slave controllers are in a busy condition, causing the alterable telephone number identity of the monitor controller to be the particular one of the plurality of predetermined telephone number identities which that paging signal has and causing the first radiotelephone transceiver which forms a first radiotelephone with the monitor controller to transmit an acknowledgement signal, so as to continue with the set-up of a call in response to that paging signal.

6. A radiotelephone apparatus in accordance with claim 4 wherein:

each first radiotelephone controller includes: a second radiotelephone controller which communicates with the first radiotelephone transceiver which forms a first radiotelephone with that first radiotelephone controller; and an adjunct radiotelephone controller which communicates with the second radiotelephone controller and with one or more adjunct radiotelephone controllers of other of said first radiotelephone controllers.

7. A telephone system comprising:

a radiotelephone system operating in cells of a region including: one or more radiotelephones; a radiotelephone apparatus; one or more base stations for radio communicating with the radio telephones and radiotelephone apparatus; a radio telephone switching office for linking said base stations; one or more control channels in which are carried paging signals which identify the ones of said radiotelephones and radiotelephone apparatus to which calls are to be connected and in which are also carried acknowledgment signals from the radiotelephones and radiotelephone apparatus for continuing the set-up of calls to the radiotelephones and radiotelephone apparatus in response to paging signals identifying the radiotelephones and radiotelephone apparatus;

said radiotelephone apparatus including: a plurality of first radiotelephone transceivers for receiving paging signals on a control channel; a plurality of first radiotelephone controllers, each first radiotelephone controller controlling and forming a first radiotelephone with a different first radiotelephone transceiver and each first radiotelephone controller having an alterable telephone number identity; one of said first radiotelephone controllers acting as a master controller and one or more of the other of said first radiotelephone controllers acting as slave controller responsive to said master controller; said master controller commanding each slave controller not to cause an acknowledgement signal to be generated by that slave controller in response to paging signals received by the first radiotelephone transceiver which forms a first radiotelephone with that slave controller; and said master controller, when a paging signal having any particular one of a plurality of predetermined telephone number identities is received by the first radiotelephone transceiver forming a first radiotelephone with said master controller, selecting a slave controller and commanding the selected slave controller to cause the alterable telephone number identity of the slave controller to be the particular one of the plurality of predetermined telephone number identities which that paging signal has and to cause the first radiotelephone transceiver which forms a first radiotelephone with that slave controller to transmit an acknowledgment signal, so as to continue with the set-up of a call in response to that paging signal.

8. A telephone system in accordance with claim 7 wherein:

each said first radiotelephone controller includes: a second radiotelephone controller which communicates with the first radiotelephone transceiver which forms a first radiotelephone with that first radiotelephone controller; and an adjunct radiotelephone controller which communicates with the second radiotelephone controller and with one or more adjunct radiotelephone controllers of other of said first radiotelephone controllers.

9. A telephone system in accordance with claim 8 further comprising:

a public switched telephone network linked to said radiotelephone switching office; and one or more further telephone stations linked to said public switched telephone network.

10. A telephone system in accordance with claim 7 wherein:

said master controller, when a paging signal having a particular one of a plurality of predetermined telephone number identities is received by the first radiotelephone transceiver forming a first radiotelephone with that master controller and when all said slave controllers are in a busy condition, causing the alterable telephone number identity of the master controller to be the particular one of the plurality of predetermined telephone number identities which that paging signal has and causing the first radiotelephone transceiver which forms a first radiotelephone with said master controller to transmit an acknowledgement signal, so as to continue with the set-up of a call in response to that paging signal.

11. A telephone system in accordance with claim 7 further comprising:

a telephone switch;

one or more telephone stations linked to said telephone switch;

one or more trunk circuits linked to said telephone switch;

and an interface circuit interfacing one or more of said one or more trunk circuits with said radiotelephone apparatus.

12. A telephone system in accordance with claim 11 wherein:

said telephone switch is a PBX.

13. A telephone system in accordance with claim 11 further comprising:

a public switched telephone network linked to said radiotelephone switching office; and one or more further telephone stations linked to said public switched telephone network.

14. A telephone system in accordance with claim 11 wherein:

said interface circuit interfaces each of said first radiotelephone controllers with a different one of said one or more trunk circuits.

15. A telephone system in accordance with claim 14 wherein:

said predetermined number of telephone identities is equal to the number of telephone numbers serving said telephone stations.

16. A telephone system in accordance with claim 15 further comprising:

a public switched telephone network linked to said radiotelephone switching office; and one or more further telephone stations linked to said public switched telephone network.

17. A telephone system comprising:

a radiotelephone system operating in cells of a region including: one or more radiotelephones; a radiotelephone apparatus; one or more base stations for radio communicating with the radio telephones and radiotelephone apparatus; a radio telephone switching office for linking said base stations; one or more control channels in which are carried paging signals which identify the ones of said radiotelephones and radiotelephone apparatus to which calls are to be connected and in which are also carried acknowledgment signals from the radiotelephones and radiotelephone apparatus for continuing the set-up of calls to the radiotelephones and radiotelephone apparatus in response to paging signals identifying the radiotelephones and radiotelephone apparatus;

said radiotelephone apparatus including: a plurality of first radiotelephone transceivers for receiving paging signals on a control channel; a plurality of first radiotelephone controllers, each first radiotelephone controller controlling and forming a first radiotelephone with a different first radiotelephone transceiver and each first radiotelephone controller having an alterable telephone number identity; a master controller; one or more of said first radiotelephone controllers being a slave controller responsive to signals from said master controller; one of said first radiotelephone controllers being a monitor controller to cause each paging signal received by the first radiotelephone transceiver which forms a first radiotelephone with that monitor controller to be transmitted to the master controller without an acknowledgment signal responding to the paging signal being caused to be generated by that monitor controller; and said master controller, when a paging signal having any particular one of a plurality of predetermined telephone number identities is transmitted to said master controller by said monitor controller, selecting a slave controller and commanding the selected slave controller to cause the alterable telephone number identity of the selected slave controller to be the particular one of the plurality of predetermined telephone number identities which that paging signal has and to cause the first radiotelephone transceiver which forms a first radiotelephone with that slave controller to transmit an acknowledgment signal, so as to continue with the set-up of a call in response to that paging signal.

18. A telephone system in accordance with claim 17 wherein:

said master controller, when a paging signal having a particular one of a plurality of predetermined telephone number identities is transmitted to said master controller by the monitor controller and when all said slave controllers are in a busy condition, causing the alterable telephone number identity of the monitor controller to be the particular one of the plurality of predetermined telephone number identities which that paging signal has and causing the first radiotelephone transceiver which forms a first radiotelephone with the monitor controller to transmit an acknowledgement signal, so as to continue with the set-up of a call in response to that paging signal.

* * * * *